Jan. 3, 1928.
A. ARUTUNOFF
1,654,774
ROTOR SHAFT AND BEARING SUPPORT FOR ELECTRIC MOTORS
Filed June 14, 1924
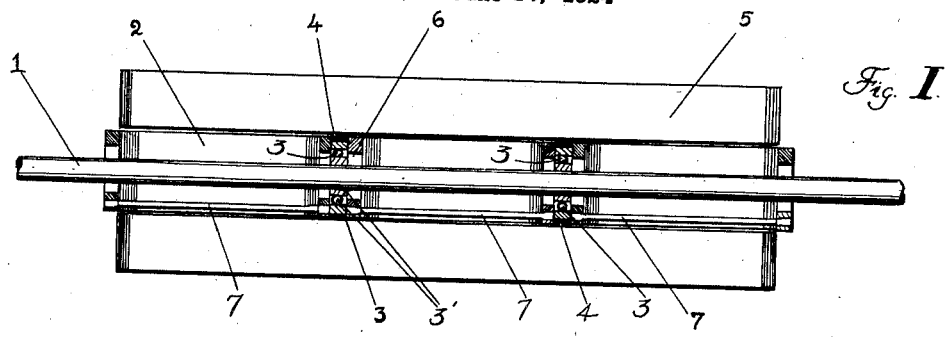
Fig. I.
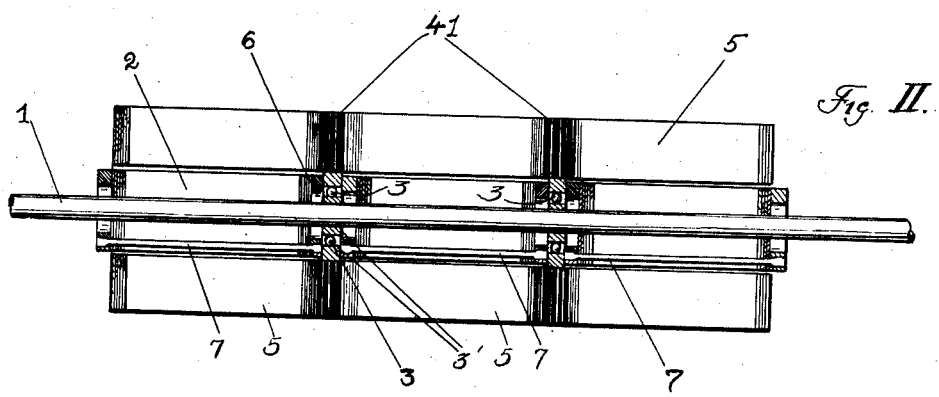
Fig. II.
INVENTOR
Armais Arutunoff
BY
ATTORNEYS Patented Jan. 3, 1928.

1,654,774

UNITED STATES PATENT OFFICE.

ARMAIS ARUTUNOFF, OF JACKSON, MICHIGAN.

ROTOR SHAFT AND BEARING SUPPORT FOR ELECTRIC MOTORS.

Application filed June 14, 1924, Serial No. 720,039, and in Germany June 20, 1923.

This invention relates to an improved construction of rotor shaft and bearing support for electric motors or other structures requiring a long shaft with a long rotor.

The main object is to provide a compact and effective bearing support for a long shaft member confined within an outer drum shell or casing, or other description as for instance, an armature within a stationary field.

This is of special advantage in alternating current structure, either motor or generator.

Objects pertaining to details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a longitudinal detail sectional view through an alternating current motor or generator, showing a series of rotors with intervening ball bearing supports, the outer shell or drum or field being shown continuous.

Fig. II is a similar longitudinal sectional view in which the field laminations embracing the bearing case are of non-magnetic material.

In the drawing similar numerals of reference refer to similar parts throughout the several views.

The numbered parts will be referred to by their numbers.

1 is the central supporting shaft which is carried by suitable external bearings of any description, not a part of this invention and not here illustrated.

2 are the rotors, either a series of rotors or sections of an elongated rotor. 3 are a series of ball bearings supported within an outer ball bearing race or ring 3' which in turn is held in position by a ring 4 of non-magnetic material.

The inner member 3' of the ball bearing is a pressed or drive fit on the shaft 1. 5 is the laminated assembly or field member which may be continuous or might be provided with a series of laminations of non-magnetic material 41 disposed opposite the bearing ring 4.

In the structure shown, a short circuiting ring 6 is shown at the end of each section, these rings being connected by rods 7, disposed through the laminations, which are preferably of copper.

The structure here illustrated is applied to alternating electric motors or generators and it is desired to claim the invention broadly and also specifically for use in that relation.

Having thus described my invention, what I claim as new and desire to secure by Letters Patent is:

1. In an alternating current motor or generator, the combination of a continuous outer field structure containing laminations, an elongated shaft with a plurality of rotors, ball bearings comprising inner and outer members, with intervening bearing balls, the inner member of which is secured to said shaft, and a supporting ring of non-magnetic material for the said outer bearing member disposed within and supported by said outer field structure.

2. In an alternating current motor or generator, the combination of a continuous outer field structure, an elongated shaft with a plurality of rotors, bearings comprising inner and outer members with intervening rolling members, the inner member of which is secured to said shaft, and a supporting ring for the said outer bearing member disposed within and supported by said outer field structure.

3. In an alternating current electric motor or generator, the combination of a continuous elongated outer field structure with axial longitudinal chamber, an elongated centrally disposed shaft within said field, a plurality of rotors secured to said shaft, and bearings between said rotors comprising inner and outer members, the inner member of each of which is secured and supported by the shaft and the outer member of which is supported within the said field structure, as specified.

4. An alternating current electric motor or generator comprising a single stationary field member or stator and two or more rotors or armatures mechanically connected, and bearings within the said field member for said rotors.

In witness whereof I have hereunto set my hand.

ARMAIS ARUTUNOFF.